United States Patent [19]

Sisk

[11] 4,322,233
[45] Mar. 30, 1982

[54] APPARATUS FOR SEPARATING ENTRAINED LIQUID FROM A LIQUID GAS MIXTURE

[75] Inventor: Francis J. Sisk, Washington Township, Armstrong County, Pa.

[73] Assignee: Westinghouse Electric Corp., Pittsburgh, Pa.

[21] Appl. No.: 35,168

[22] Filed: May 2, 1979

[51] Int. Cl.³ .............................................. B01D 46/12
[52] U.S. Cl. ....................................... 55/426; 55/397; 55/440; 55/448; 122/488; 376/371
[58] Field of Search .................................... 55/397–399, 55/426, 440, 448, 450, 457, 461; 122/488–492, 487; 176/37, 54

[56] References Cited

U.S. PATENT DOCUMENTS

| | | | |
|---|---|---|---|
| 1,123,232 | 1/1915 | Brassert et al. | 55/457 X |
| 2,648,397 | 8/1953 | Ravese et al. | 55/448 X |
| 2,759,558 | 8/1956 | Bourne | 55/426 X |
| 2,862,479 | 12/1958 | Blaser et al. | |
| 3,057,333 | 10/1962 | Kuhner | |
| 3,066,088 | 11/1962 | Blaser | |
| 3,086,343 | 4/1963 | Stern | |
| 3,307,335 | 3/1967 | Shomaker | 55/448 X |
| 3,507,099 | 4/1970 | Marshall | 122/488 X |
| 3,581,477 | 6/1971 | Bell et al. | 55/397 X |
| 3,735,569 | 5/1973 | Micheller et al. | |
| 3,751,886 | 8/1973 | Sokolowski | |
| 3,769,781 | 11/1973 | Klein et al. | |
| 3,788,282 | 1/1974 | Modrak et al. | |
| 3,789,588 | 2/1974 | Laubli | |
| 3,881,900 | 5/1975 | Campbell et al. | |
| 3,924,575 | 12/1975 | Zipay | 122/491 X |
| 3,992,172 | 11/1976 | Clark | |
| 4,015,960 | 4/1977 | Nutter | 55/457 X |
| 4,070,168 | 1/1978 | Beattie | |

FOREIGN PATENT DOCUMENTS 937549 9/1963 United Kingdom .

Primary Examiner—Richard L. Chiesa
Attorney, Agent, or Firm—F. J. Baehr, Jr.

[57] ABSTRACT

A vessel wall cooperating with a circular array of moisture separators which have a vertical riser tube, centrally disposed hubs, a vertical baffle disposed between the hub and the riser tube, turning vanes and an outer volute partial skirt or wall to compress the steam-water mixture against the volute and vessel wall and utilize the downwardly spiraling flow of liquid film formed on the volute and vessel wall to effectively separate the entrained water from the steam and prevent reentrainment thereof.

14 Claims, 9 Drawing Figures

APPARATUS FOR SEPARATING ENTRAINED LIQUID FROM A LIQUID GAS MIXTURE

BACKGROUND OF THE INVENTION

1. Field of the Invention

This invention relates to apparatus for separating entrained liquid from a liquid-gas mixture and more particularly to separators for removing entrained moisture from saturated steam in nuclear steam generators.

2. Description of the Prior Art

Steam water separators of the flow deflection type have been utilized in pressurized water reactor nuclear steam generators as the primary or rough moisture separators. They employ axial stator vanes in the riser tubes to promote axial deflection of the entrained water in the riser tube. Another tube of separator employs radial outflow stator vanes to promote a circulating sheet of water in the shroud surrounding the riser tube. U.S. Pat. Nos. 3,751,886 and 3,992,172, respectively, show typical moisture separating apparatus utilizing these principles.

SUMMARY OF THE INVENTION

In general, a separator for separating entrained liquid from a gas-liquid mixture, when made in accordance with this invention, comprises a generally vertically oriented riser tube having a cap on the upper end and an inlet for the mixture on the other end. The riser tube has an opening adjacent the cap and a generally vertically oriented baffle disposed therein. The baffle extends from one edge of the opening toward the central portion of the riser tube. A plurality of turn vanes are disposed in the opening to change the direction of flow of the mixture from generally vertical to generally horizontal. A vertically oriented generally curved wall is disposed on the outer side of the riser tube. The curved wall is contiguous with the riser tube adjacent the opening and spaced further from the riser tube as the curved wall passes the opening and extends therebeyond. The curvature, extent, and disposition of the curved wall is such that the mixture is compressed against the curved wall and remains contiguous therewith for a sufficient period to effectuate separation and prevent reentrainment of the liquid and gas.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
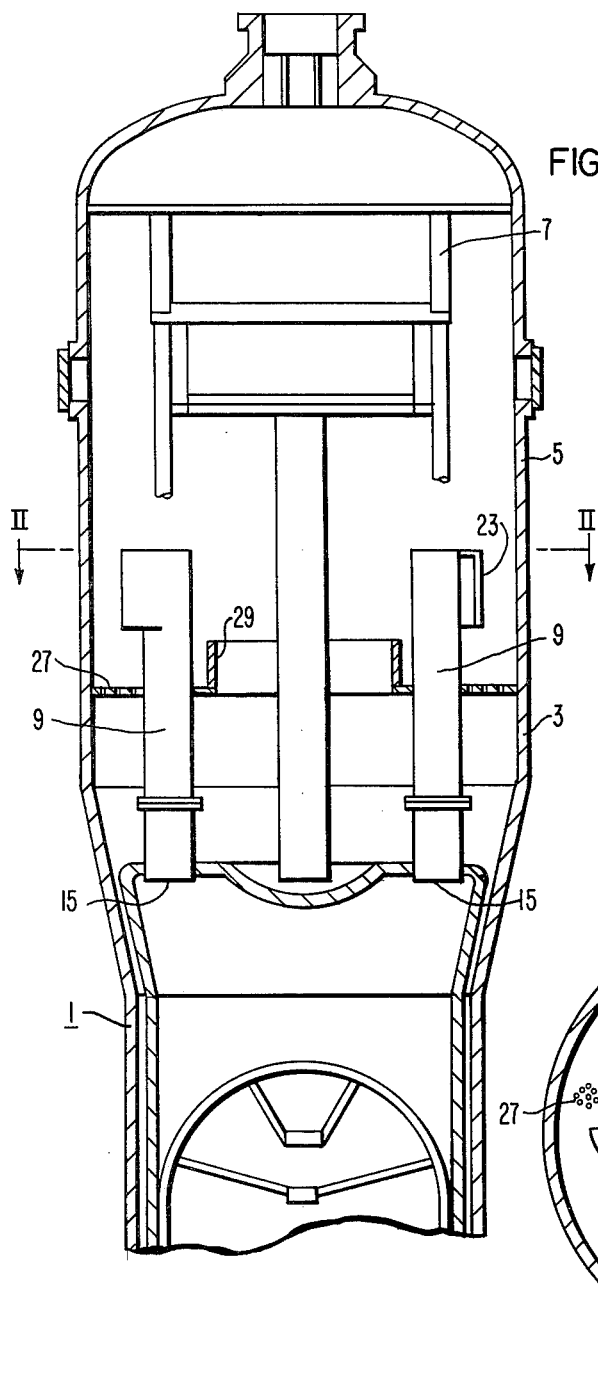
FIG. 1 is a partial sectional view of a steam generator with a moisture separator made in accordance with this invention disposed therein.
Figure 2:
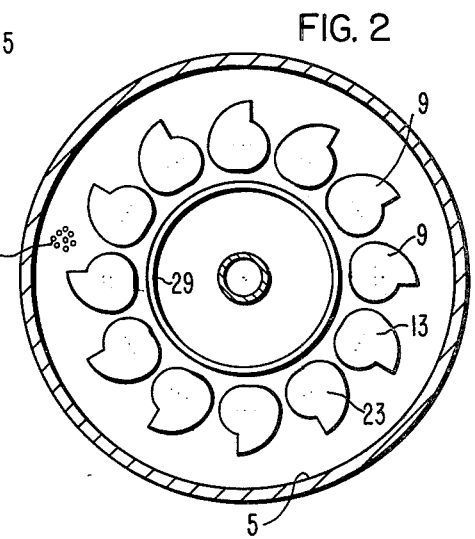
FIG. 2 is a sectional view taken on line II—II of FIG. 1.
Figure 3:
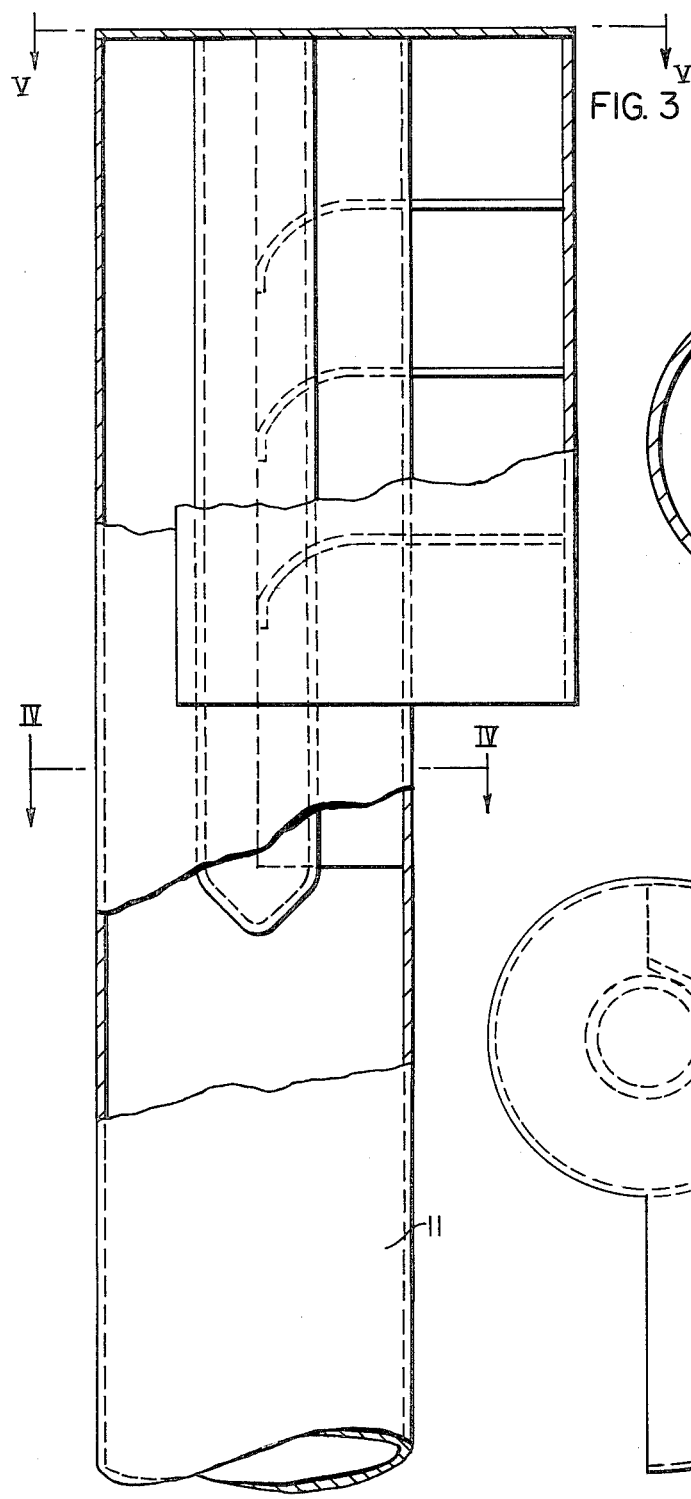
FIG. 3 is an elevational view partially in section of the moisture separator riser tube.
Figure 4:
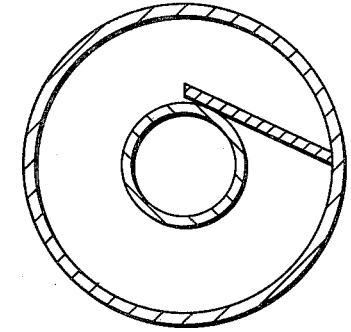
FIG. 4 is a sectional view taken on line IV—IV of FIG. 3.

Referring now to the drawings in detail and in particular to FIGS. 1 and 2 there is shown an upper portion of a steam generator 1 having a generally vertically oriented shell 3 with a vertically oriented generally cylindrical wall 5, which encircles two stages 7 and 9 of moisture separation. The second stage moisture separator 7 is a chevron type, which is well known in the art. The first stage moisture separator 9 utilizes radial outflow to promote a circulating sheet of water on the shroud or wall which is maintained on the wall for sufficiently long periods to allow effective separation of the moisture from the steam and arrangements are made to deliver the separated moisture or water to the steam generator water line substantially free from turbulence in order to prevent reentrainment of the water and steam. While the preferred embodiment is depicted in the setting of a steam generator in which steam and water are the fluids to be separated, this invention is intended to incorporate the separation of any liquid which is entrained in a liquid-gas mixture.

Referring now to the drawings 1 through 7 the second stage separator 9 comprises the vertically oriented cylindrical wall 5 of the shell 3 and a plurality of generally vertically oriented ducts or riser tubes 11 disposed within the shell 3 in a spaced relationship with the cylindrical wall 5.

As shown in FIGS. 3 through 7 each riser tube 11 has an end closure or cap 13 enclosing the upper end, an open lower end, which serves as an inlet 15, and an elongated, rectangular shaped exit nozzle or opening 17 disposed adjacent the cap 13. An elongated enclosed cylindrical central body member or hub 19 is centrally disposed in the upper portion of the riser tube 11 and extends from the cap 13 to below the lower margin of the opening 17. A generally vertically oriented planar baffle 21 has one end disposed contiguous with one of the vertical margins of the opening 17, extends toward the central portion of the riser tube 11 and has another edge which engages the hub 19 and is disposed generally tangential thereto. A generally vertically oriented curved wall portion 23 is disposed on the outer side of the riser tube 11. One generally vertically oriented margin of the curved wall portion 23 is disposed contiguous with one of the vertically oriented margins of the opening 17 and is spaced further from the riser tube 11 as the curved wall portion 23 passes the opening 17 and extends therebeyond generally forming a volute. The cap 13 also encloses the upper end of the generally volute shaped space between the curved wall portion 23 and the riser tube 11. The space adjacent the lower margin of the curved wall portion 23 is unobstructed or open.

Figure 5B:
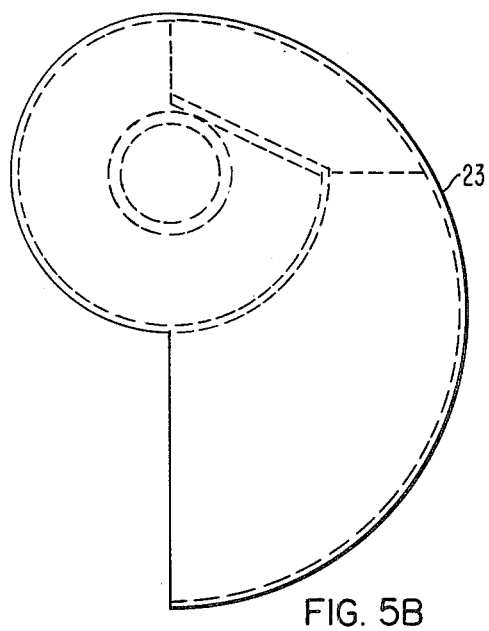
FIG. 5B is a sectional view taken on line V—V of FIG. 3 showing a modified structure.
Figure 6:
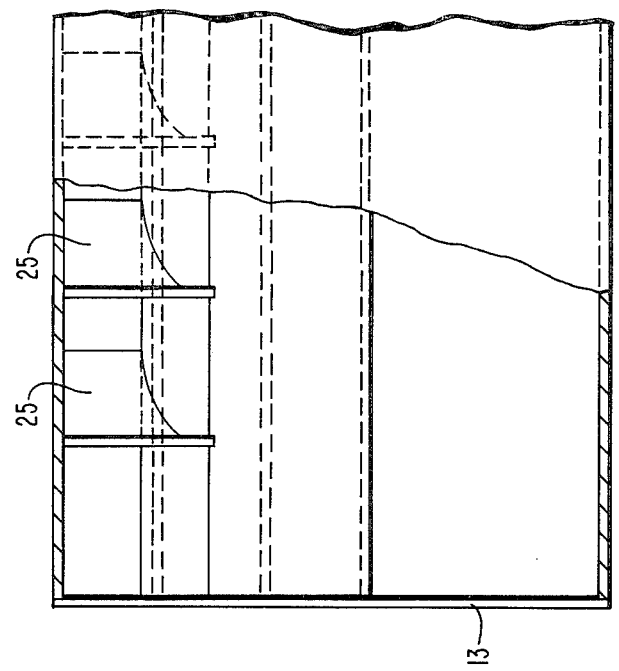
FIG. 6 is a sectional view taken on line VI—VI of FIG. 5A.
Figure 5A:
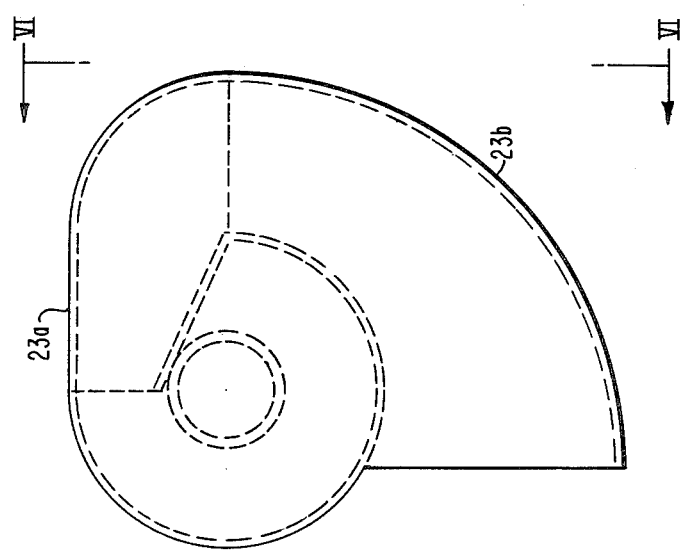
FIG. 5A is a sectional view taken on line V—V of FIG. 3.

As may be seen best in FIGS. 5A and 5B the generally curved wall portion 23 generally forming a volute may contain a flat portion 23a and curve portions 23b of different radii. The curved portion 23 may also be curved throughout its length as shown in FIG. 5B. The exact nature of the curve of the curved wall portion 23 is not as critical as the extent and disposition thereof. However, it is noted that the curvature, extent, and disposition of the curved wall 23 is preferably such that the mixture of steam and water is compressed against the curved wall 23 and is directed toward or against the cylindrical wall 5 of the shell 3 generally tangentially to the shell 3 to effectuate separation and prevent reentrainment of the steam and water.

Figure 7:
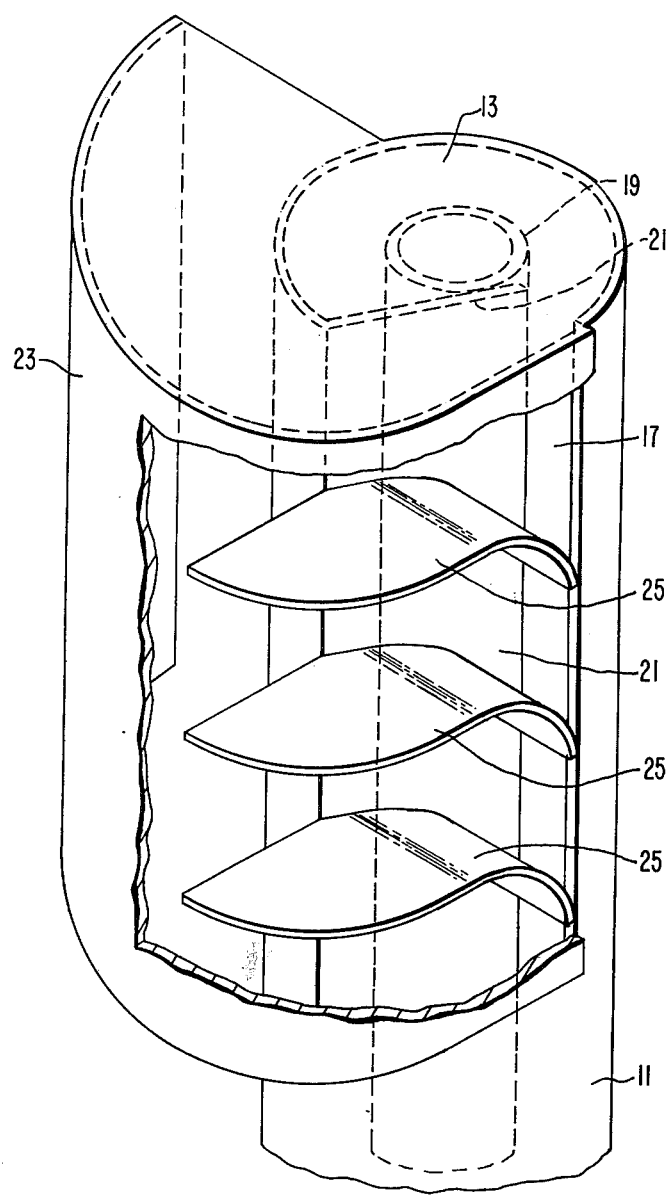
FIG. 7 is a partial perspective view partially in section showing the internals of the moisture separator.

As may be seen best in FIG. 7, disposed within the opening 19 are a plurality of turning vanes 25, which generally change the direction of the flow of the mixture from a generally vertical direction to a generally horizontal direction.

A test model having the following proportions has been effective in providing good separation of the entrained moisture from an air-water mixture. The opening 17 encompassed approximately 90° and has a vertical dimension approximately equal to one and one-half riser tube diameters. A hub 19 having a length approximately equal to two riser tube diameters and a diameter of approximately 0.4 times that of the diameter of the riser tube 11. The vertical baffle 21 extends from the cap 13 to below the lower margin of the opening 17. Three directional vanes 25 were used and have their leading edge cambered downwardly and disposed in the annular space between the hub 19 and the riser tube 11 and extend through the opening 17 and into the space between the riser tube 11 and curved wall portion 23. The turning vanes 25 generally extend from the inner edge of the vertical baffle 21 through about the first 90° of the curved wall portion 23 as they turn from a generally vertical orientation to a generally horizontal orientation. The curved wall portion 23 encompasses approximately 180° when utilized in conjunction with the shell wall 5 or some other large diameter vertically oriented cylindrical member. The trailing edge of the curved wall portion 23 is oriented so that the fluid exiting therefrom is directed at a high incidence angle to the cylindrical wall 5 or generally tangential to or generally coincident therewith. The mixture of water and steam is directed from the circular array of curve wall portions 23 to form a circulating and falling film on the shell wall 5 so that the water spirals downwardly along the shell wall 5. Preferably an annular perforated plate 27 is disposed below the curved wall portion 23 so that the outer margin is contiguous with the shell wall 5 and the inner margin is inside the circular array of riser tubes 11. A collar 29 extends upwardly from the inner margin of the perforated plate 27 providing a barrier, which diffuses and distributes the separated water over a large portion of the shell to prevent steam from being carried deep into the waterline in the wake of local fast water currents in order to prevent reentrainment.

It is recognized that the curved wall portion 23 may be extended beyond 180° to form a compressed layer of mixture adjacent the curved wall portion 23 in order to form a film of water on the curved wall portion 23, which spirals downwardly as it progresses along the curvature of the curved wall portion 23 so that as the fluid exits from the curved wall portion 23 there is a sheet of water leaving the lower portion of the curved wall portion 23 and essentially water-free steam exits from the end of the curved wall 23.

Figure 8:
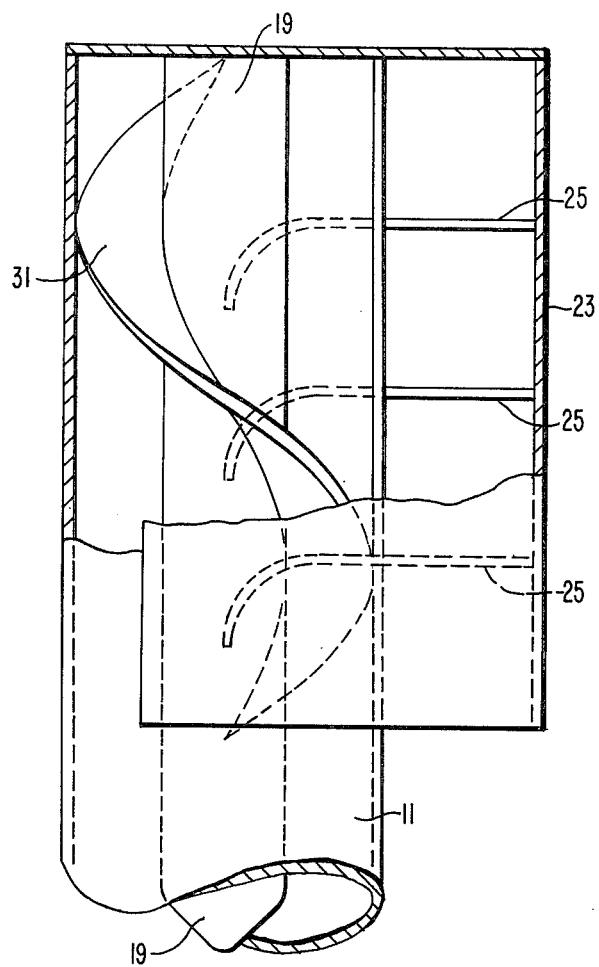
FIG. 8 is an elevational view of a moisture separator with a helical vane disposed therein.

FIG. 8 shows an alternate embodiment in which a helical baffle 31 spirals upwardly in the annular space between the hub 19 and the riser tube 11 streamlining the flow path of the mixture and reducing the pressure drop within the riser tube 11.

The apparatus hereinbefore described provides an improved method of separating entrained water from saturated steam utilizing the vertical flow riser tube or duct 11 which employs a central body or hub 19 centrally disposed in the duct 11, a closure or cap 13 at the upper end of the duct 11 and an exit nozzle or opening 21 projecting tangentially into the duct annulus. The baffle 21 blocking a section of the duct annulus forces the fluid mixture to spiral around the central body or hub 19 to gain access to the exit nozzle 17. The fluid mixture discharges into the volute or area bounded by the duct 11 and curved wall 23 in which water is separated forming a film upon the curved wall 23 and then discharged tangentially upon the encircling shell wall 5 to provide good separation and prevent reentrainment.

What is claimed is:

1. A separator for separating entrained liquid from a gas-liquid mixture, said separator comprising a generally vertically oriented riser tube having a cap on the upper end and an inlet for said mixture on the lower end;

said riser tube having an opening adjacent said cap and a generally vertically oriented planar baffle disposed within said riser tube;

said planar baffle extending from one edge of said opening toward said central portion of said riser tube; and a vertically oriented generally curved wall disposed on the outer side of said riser tube, contiguous with said riser tube adjacent said opening, and spaced farther from said riser tube as said curved wall passes said opening and extends therebeyond;

the contour extent and disposition of said curved wall being such that said mixture is compressed against said curved wall and remains contiguous therewith for a sufficient period to effectively separate and to prevent reentrainment of said liquid and said gas.

2. A separator as set forth in claim 1 and further comprising an elongated hub disposed in the central portion of the riser tube.

3. A separator as set forth in claim 2, wherein the elongated hub extends from the cap to below the lower edge of the opening in the riser tube.

4. A separator as set forth in claim 2, wherein the vertically oriented planar baffle is contiguous with the riser tube adjacent the opening and is disposed generally tangentially to the elongated hub.

5. A separator as set forth in claim 1, wherein the cap extends outwardly to said curved wall enclosing the upper end of the space between the riser tube and the curved wall, the space between the riser tube and the curved wall adjacent the lower edge of the curved wall is unobstructed.

6. A separator as set forth in claim 1, wherein the space between the curved wall and the riser tube is unobstructed adjacent the lower margin of the curved wall.

7. A separator as set forth in claim 1 and further comprising a plurality of turn vanes disposed within the opening to change the direction of flow of the mixture from generally vertical to generally horizontal.

8. A separator for separating entrained liquid from a gas-liquid mixture, said separator comprising a large diameter generally cylindrical wall having a generally vertical orientation;

a plurality of generally vertically oriented riser tubes disposed within said cylindrical wall and in a spaced relationship therewith;

said riser tubes each having a cap on the upper end and an inlet for said mixture on the lower end;

said riser tubes each having an opening adjacent said cap and a generally vertically oriented planar baffle disposed within each of said riser tubes;

said baffle extending from one edge of said opening toward the central portion of each of said riser tubes; and a vertically oriented generally curved wall disposed on the outer side of each of said riser tubes, contiguous with each of said riser tubes, and adjacent said opening and spaced farther from each of said riser tubes as said curved wall passes said opening and extends therebeyond;

the curvature, extent, and disposition of said curved wall being such that said mixture is compressed against said curved wall and is directed against said cylindrical wall generally tangentially to effectuate separation and prevent reentrainment of said liquid and said gas.

9. The separator as set forth in claim 8 and further comprising an annular perforated plate having its outer margin contiguous with the cylindrical wall.

10. A separator as set forth in claim 9, wherein the riser tubes are disposed in a circular array and the inner margin of the annular perforated plate is smaller than the circle upon which the riser tubes are disposed.

11. A separator as set forth in claim 10 further comprising a collar extending upwardly from the inner margin of said annular perforated plate.

12. A separator as set forth in claim 11, wherein the cylindrical wall is a shell wall.

13. A separator as set forth in claim 8, wherein the cylindrical wall is a shell wall.

14. A separator as set forth in claim 8 and further comprising a plurality of turn vanes disposed within the opening to change the direction of flow of the mixture from generally vertical to generally horizontal.

* * * * *